(12) United States Patent
Lebkuchner et al.

(10) Patent No.: US 8,083,500 B1
(45) Date of Patent: Dec. 27, 2011

(54) MOTOR PUMP

(75) Inventors: Benno Lebkuchner, Thompson, CT (US); Hans L. Kuster, Barrington, RI (US)

(73) Assignee: AquaMotion, Inc., Barrington, RI (US)

( * ) Notice: Subject to any disclaimer, the term of this patent is extended or adjusted under 35 U.S.C. 154(b) by 810 days.

(21) Appl. No.: 12/136,873

(22) Filed: Jun. 11, 2008

(51) Int. Cl.
   *F04B 35/04* (2006.01)
(52) U.S. Cl. .......... 417/423.12; 417/423.14; 417/423.15
(58) Field of Classification Search ............ 417/423.12, 417/423.14, 423.115; 310/86, 87, 402, 405
See application file for complete search history.

(56) References Cited

U.S. PATENT DOCUMENTS

| | | | |
|---|---|---|---|
| 2,650,866 A * | 9/1953 | Knudson | 384/537 |
| 3,256,829 A * | 6/1966 | Schneider | 417/368 |
| 4,274,683 A * | 6/1981 | Gray et al. | 384/106 |
| 4,281,973 A * | 8/1981 | Meneghello | 417/423.12 |
| 4,404,483 A * | 9/1983 | Lebkuchner | 310/86 |
| 4,790,683 A * | 12/1988 | Cramer et al. | 403/372 |
| 4,990,068 A | 2/1991 | Zhong | |
| 5,034,644 A * | 7/1991 | Kech | 310/405 |
| 5,044,789 A * | 9/1991 | Damon et al. | 384/581 |
| 5,059,042 A * | 10/1991 | Grierson | 384/537 |
| 5,549,459 A | 8/1996 | Nixon | |
| 6,617,733 B1 * | 9/2003 | Yamauchi et al. | 310/90.5 |
| 2002/0085940 A1 * | 7/2002 | Bodzak | 418/182 |
| 2007/0096572 A1 * | 5/2007 | Watkins et al. | 310/90 |

* cited by examiner

*Primary Examiner* — Charles Freay
*Assistant Examiner* — Christopher Bobish
(74) *Attorney, Agent, or Firm* — Salter & Michaelson

(57) ABSTRACT

An improved motor pump that enables the serviceability thereof, as well as improved clearance between components of the motor pump, the motor pump including a stator assembly, a rotor assembly having a front bearing for supporting a motor shaft and a bearing support member for receiving the front bearing, and a sleeve assembly including a sleeve. Both the bearing support member and the sleeve have respective pilot sections. An interface surface is defined between the bearing support member and the sleeve that includes an undulating surface with separate but multiple contact locations therebetween. The bearing support member is inserted into the sleeve so that the respective pilot sections engage to thus provide essentially a clearance-less fit therebetween.

25 Claims, 8 Drawing Sheets

MOTOR PUMP

RELATED APPLICATION

This application relates to an application in the name of the same inventor entitled "MOTOR PUMP BEARING", and filed of even date herewith, and assigned application Ser. No. 12/136,851. This co-pending application is hereby incorporated by reference herein in its entirety.

FIELD OF THE INVENTION

The present invention relates in general to an improved motor driven pump. More particularly, the present invention is directed to an improved motor pump, preferably a canned motor pump, and in which the motor pump is characterized by both the accurate alignment of components and by the ease of field serviceability.

BACKGROUND OF THE INVENTION

Canned motor pumps are widely used to circulate water in heating and plumbing systems. Examples of canned motor pumps are found in U.S. Pat. Nos. 4,990,068 and 5,549,459. Canned motor pumps are lubricated by the fluid being pumped which typically is water. These pumps are commonly referred to as water lubricated pumps. The pumps are typically driven by an electric motor and the rotor of the motor, as well as the pump impeller, are mounted on a common shaft. An inherent feature of canned motor pumps is that all rotating parts are immersed in the fluid being pumped. Because of that they generally do not require any dynamic seals such as packings or mechanical seals. Since the shaft is immersed in the fluid being pumped, it follow that the bearings supporting the shaft are also immersed in the fluid, usually water. It is a common practice to use sleeve bearings, as opposed to ball bearings, in canned motor pumps. To prevent the fluid from flooding the motor stator, there is provided a thin wall tube that is disposed between the stator and rotor. This thin walled tube is commonly referred to as a sleeve.

Two of the desirable features that canned motor pumps should have are (1) good alignment of components and (2) field serviceability. Pumps currently on the market are either field serviceable but have potentially poor alignment, while others provide proper alignment but are not readily field serviceable. The objective of the present invention is to provide a motor pump, particularly a canned motor pump, which is characterized by proper alignment between pump components, as well as the ability to be easily serviced in the field.

SUMMARY OF THE INVENTION

To accomplish the foregoing and other objects, features and advantages of the present invention there is provided a motor pump, and preferably a canned motor pump. The motor pump comprises a pump housing; a motor housing; a pump shaft supported in the motor housing and including an impeller extending into the pump housing; a rotor-stator structure in the motor housing for driving the shaft; a front bearing and a rear bearing for supporting the shaft; a bearing support member to which the front bearing is mounted; a sleeve into which the bearing support member is inserted; and an interface surface defined between the bearing support member and the sleeve and having an undulating surface with separate but multiple contact locations therebetween.

In accordance with other aspects of the present invention the motor may be a canned motor pump in which the fluid that is being pumped passes through the sleeve, the bearing support member has a pilot section and the sleeve has a pilot section that includes the undulating surface, the respective pilot sections adapted for relative engagement therebetween; the pilot section of the bearing support member is cylindrical; the undulating surface includes multiple undulations so as to provide multiple contact lines between the sleeve and bearing support member; the undulating surface may include three undulations; the pilot section of the sleeve preferably has a wall thickness in a range of 0.006 to 0.020 inch; the pilot section L of the bearing support member is preferably at least 50% of the diameter D of the bearing support member; the bearing support member is preferably constructed with a reverse bend; and wherein the bend has the bearing mounted at one side thereof, while the opposite side forms the pilot section of the bearing support member.

In accordance with another version of the present invention there is provided a method for providing an improved motor pump that enables the serviceability thereof, as well as improved clearance between components of the motor pump, the motor pump including a stator assembly, a rotor assembly having a front bearing for supporting a motor shaft and a bearing support member for receiving the front bearing, and a sleeve assembly including a sleeve. Both the bearing support member and the sleeve have respective pilot sections. The method comprises the steps of providing an interface surface defined between the bearing support member and the sleeve that includes an undulating surface with separate but multiple contact locations therebetween, and inserting the bearing support member into the sleeve so that the respective pilot sections engage to thus provide essentially a clearance-less fit therebetween.

In accordance with still other aspects of the method of the present invention the interface surface permits ready engagement and dis-engagement between the bearing support member and the sleeve; including providing the undulating surface on the sleeve; including providing the pilot section of the bearing support member as a cylindrical surface; wherein the undulating surface includes multiple undulations so as to provide multiple contact lines between the sleeve and bearing support member, such as three; providing the pilot section of the sleeve with a preferred wall thickness in a range of 0.006 to 0.020 inch; and providing the pilot section L of the bearing support member is preferably at least 50% of the diameter D of the bearing support member.

DESCRIPTION OF THE DRAWINGS

Numerous other objects, features and advantages of the present invention should now become apparent upon a reading of the following detailed description taken in conjunction with the accompanying drawings, in which.

DETAILED DESCRIPTION

The preferred embodiment of the present invention is shown in FIGS. 7-10 herein. However, before discussing that embodiment reference is now made to certain aspects that have been considered in arriving at the structure of the present invention.

Figure 1:
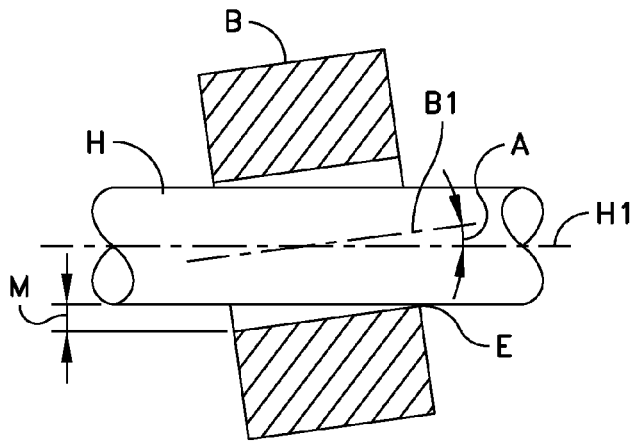
FIG. 1 is a schematic diagram illustrative of a misalignment of components that may occur in a canned motor pump.
Figure 2:
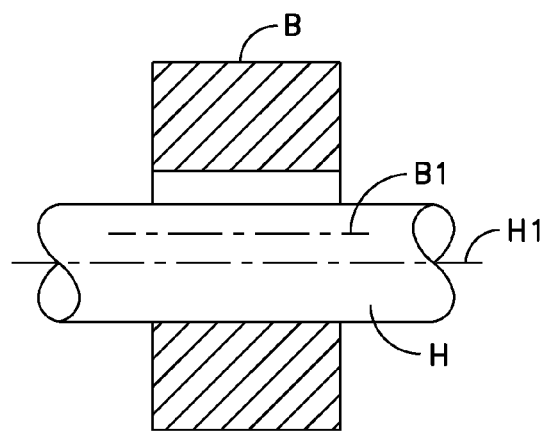
FIG. 2 is a schematic diagram illustrative of a proper alignment of components that is preferred in a canned motor pump.
Figure 3:
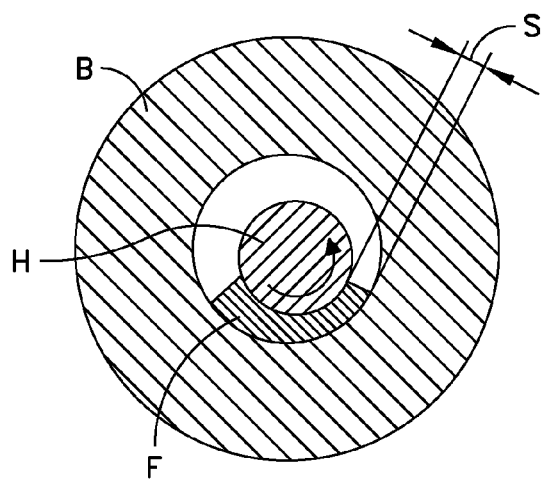
FIG. 3 is a schematic diagram illustrative of a minimum film thickness between the shaft and bearing in the pump of FIGS. 1 and 2.

Reference has been made previously to the importance of the alignment of components in the motor pump. In this regard, the referenced alignment may be considered as having two components: 1) bearing alignment and 2) rotor alignment. FIGS. 1-3 are helpful in understanding these parameters and particularly the relationship between the schematically illustrated bearing B and shaft H.

1) Bearing alignment. This is defined as the deviation from parallel of the respective shaft axis H1 and bearing axis B1, as indicated by angle A in FIG. 1. The most desirable alignment is A=zero, i.e., the two axes H1 and B1 are perfectly parallel, as shown in FIG. 2. Also, in any sleeve bearing construction, one strives to achieve a hydrodynamic condition, i.e., the development of a film F of lubricant which completely separates the shaft H and bearing B, thus eliminating wear. This ideal condition is schematically depicted in FIG. 3 where the fluid F is shown disposed between the shaft H and the bearing B. Excessive misalignment interferes with the development of the film, especially if the lubricant has a very low viscosity, as is the case in particular with water. An undesirable condition develops when dimension "m" in FIG. 1 becomes larger than dimension "s" in FIG. 3. In that event, the shaft continuously rubs against the edge of the bearing and both the shaft and the bearing become subject to wear. This is diagrammatically illustrated in FIG. 1 as an "edge loading" as at area E. Due to manufacturing methods and the accumulation of part tolerances, it is not always economically possible to consistently achieve the proper separation between the components, particularly when the bearings are small. The aim in accordance with the present invention is to absolutely minimize component misalignment so as to substantially reduce component wear.

2) Radial alignment. In an electric motor the location of the respective rotor and stator axes ideally coincide. However, again, due to component tolerances in practice they hardly ever do coincide but generally deviate to some degree. Rotor-stator misalignment causes noise and radial forces which must be carried by the bearings. The more misalignment there is, the larger the forces that are imposed.

As indicated before in addition to the alignment issue, there is the issue of providing a motor pump that can be readily serviced in the field, without requiring special tools or requiring that the motor pump be returned to a main shop for servicing. In this regard the field serviceability may be defined as the ability to disassemble and re-assemble the pump in the field, using ordinary tools, so that the parts in contact with the fluid can be cleaned in the event that contaminated water has caused excessive deposits of dirt or other surface contaminants on critical part surfaces.

Figure 4:
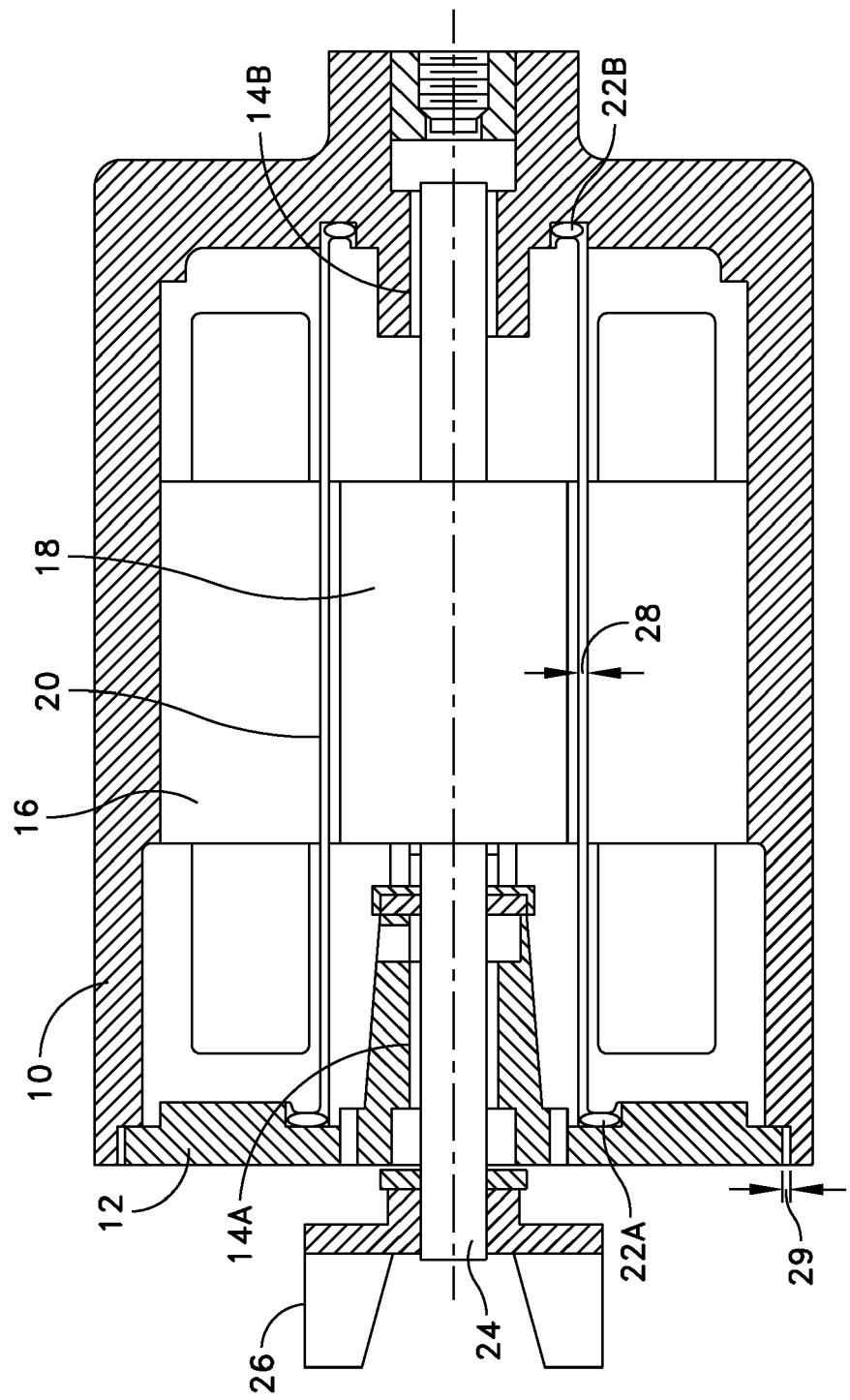
FIG. 4 is a cross-section view of a pump motor having good serviceability but poor alignment.
Figure 5:
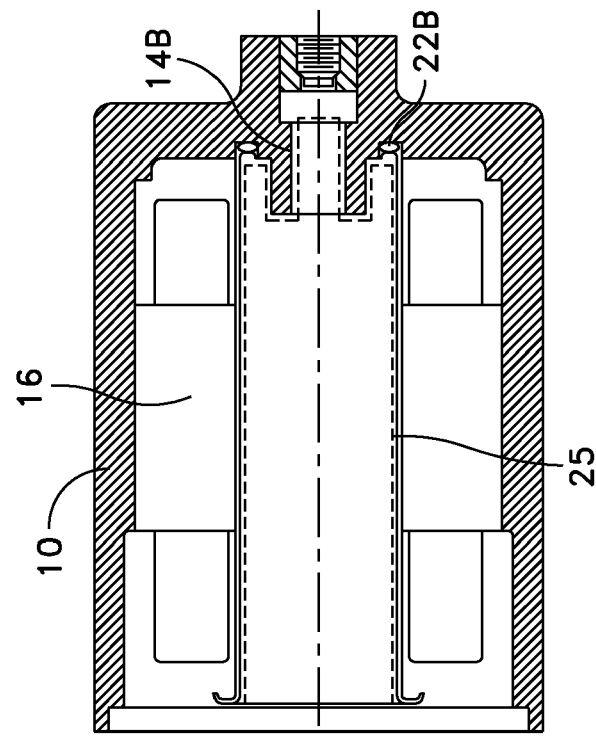
FIG. 5 is an exploded view of the pump motor of FIG. 4.
Figure 5:
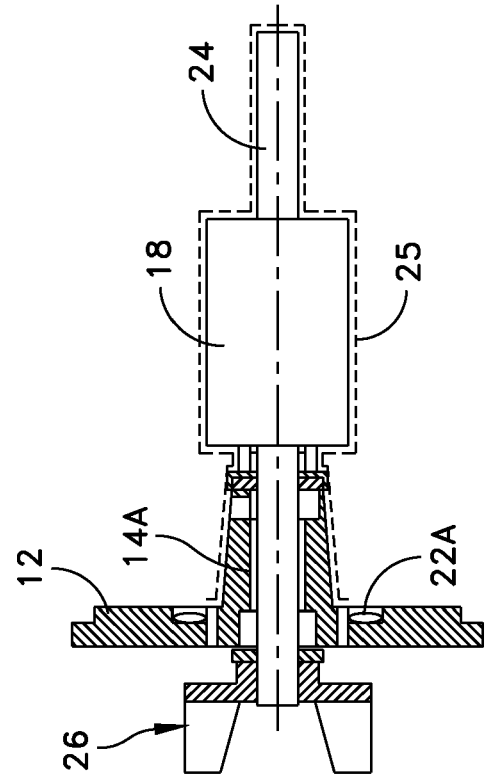

Reference is now made to one known pump construction shown in FIGS. 4 and 5 and that is illustrative of the possibility of component misalignment. FIG. 4 is a cross sectional view of a motor pump (less the pump housing) which has potentially poor alignment but is field serviceable. FIG. 5 shows the separated pump sub-assemblies when disassembled (again less the pump housing). FIGS. 4 and 5 show the motor housing 10, the front bearing support 12, as well as bearings 14A and 14B. Within the motor housing is disposed the stator 16 and adjacent thereto the rotor 18. A sleeve 20 is shown supported between the rotor and stator with associated o-ring seals 22A and 22B. The shaft 25 holds the rotor and is supported by the two bearings. The front end of the shaft 24 supports the pump impeller 26. FIG. 5 shows by the dotted lines, at 25, surfaces that are subject to dirt deposits within the rotor chamber.

When components of a motor pump are manufactured, they hardly ever emerge absolutely error-free, rather, they deviate most of the time from the ideal conditions. There is some room for a certain amount of error. As long as parts are within the allowed range of error, they are typically used. The assembled end-product is also saddled with errors due to the accumulation of all the individual component errors. The objective is to keep the total accumulated errors as low a possible. It stands to reason that if the number of individual errors is kept at a minimum, the accumulated error is also lower. The types of error occurring are "out of concentric," "out of square" and "clearances." The pump in FIGS. 4 and 5 may be considered as having 7 error locations affecting alignment and 10 locations affecting stator-to-rotor eccentricity. The disadvantage of the pump construction shown in FIGS. 4 and 5 is that there is a tendency for there to be tolerance problems. This comes about to at least some extent by the necessary clearance fit at 28 between the sleeve 20 and the stator 16, as well as the clearance fit at 29 between the motor housing 10 and the bearing support plate 12. The advantage of the motor pump of FIGS. 4 and 5 is that it is easily serviceable.

Figure 6:
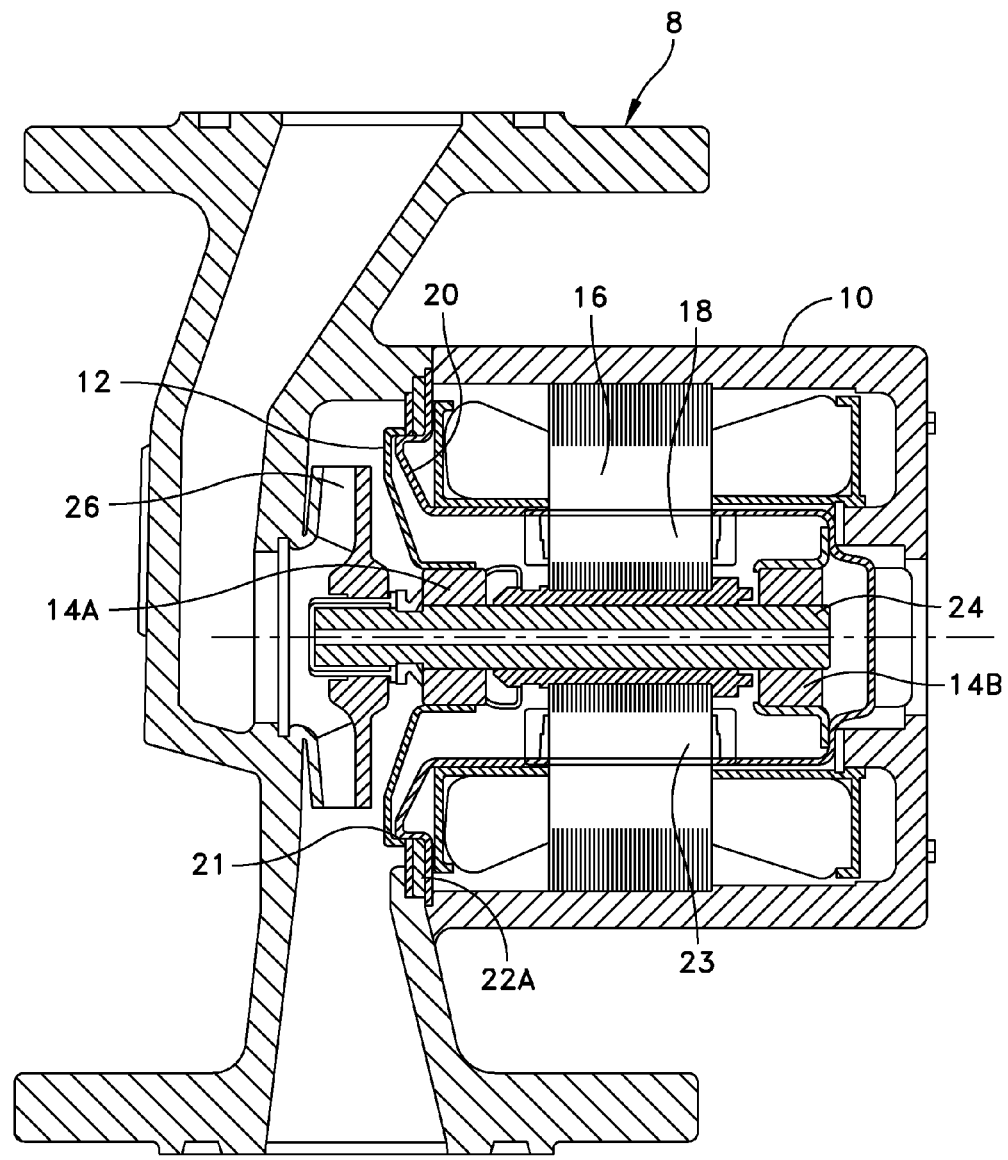
FIG. 6 is a cross-sectional view of another motor pump having improved alignment but not field serviceable.

Reference is now made to FIG. 6 for an illustration of a cross section of a pump with excellent alignment. However, press-fits are used in two places. Because of that, disassembly with ordinary tools is not possible and reassembly would require a press and a special fixture. The pump illustrated in FIG. 6 has 3 error locations affecting alignment and 4 locations affecting stator-to-rotor eccentricity. In the motor pump of FIG. 6 the same reference numbers are used to identify like components previously described in connection with the motor pump of FIGS. 4 and 5. Thus, there is shown in FIG. 6 the motor housing 10 supported in the pump housing 8. Also shown are the bearing support 12, bearings 14, stator 16, rotor 18, sleeve 20, seal 22, shaft 24 and impeller 26. The press-fit occurs, at 21, between the sleeve 20 and the bearing support 12, as well as, at 23, between the sleeve 20 and stator 16. Again, the motor pump of FIG. 6 is characterized by good alignment of components but is not serviceable in the field due to the use of press-fits between components.

In the motor pump shown in FIG. 6 the bearing support is press-fitted to the sleeve and the sleeve to the stator, making disassembly with ordinary tools impossible. The use of press-fits in FIG. 6 contributes significantly to the improved alignment. However, if the pump were to be made serviceable, the pressfits (particularly the bearing support-sleeve press-fit) would have to be replaced by clearance fits, which would immediately introduce additional locations of misalignment.

Now, in accordance with the present invention there is provided a motor pump, preferably a canned motor pump, that has excellent alignment characteristics, as well as being readily serviceable in the field. In this regard refer to FIG. 7 which shows a cross section through a preferred embodiment of the motor pump of the present invention. FIG. 8 is a cross section through the central sub-assembly 30 (cartridge) which contains all rotating parts (which are also the parts submerged in the fluid being pumped). The pump illustrated in FIGS. 7-10 has 4 error locations affecting both alignment and stator-to-rotor concentricity. FIG. 9 shows the pump in its disassembled state. FIG. 10 is a cross-sectional view taken along line 10-10 of FIG. 8 to illustrate the novel sleeve of the present invention.

Figure 7:
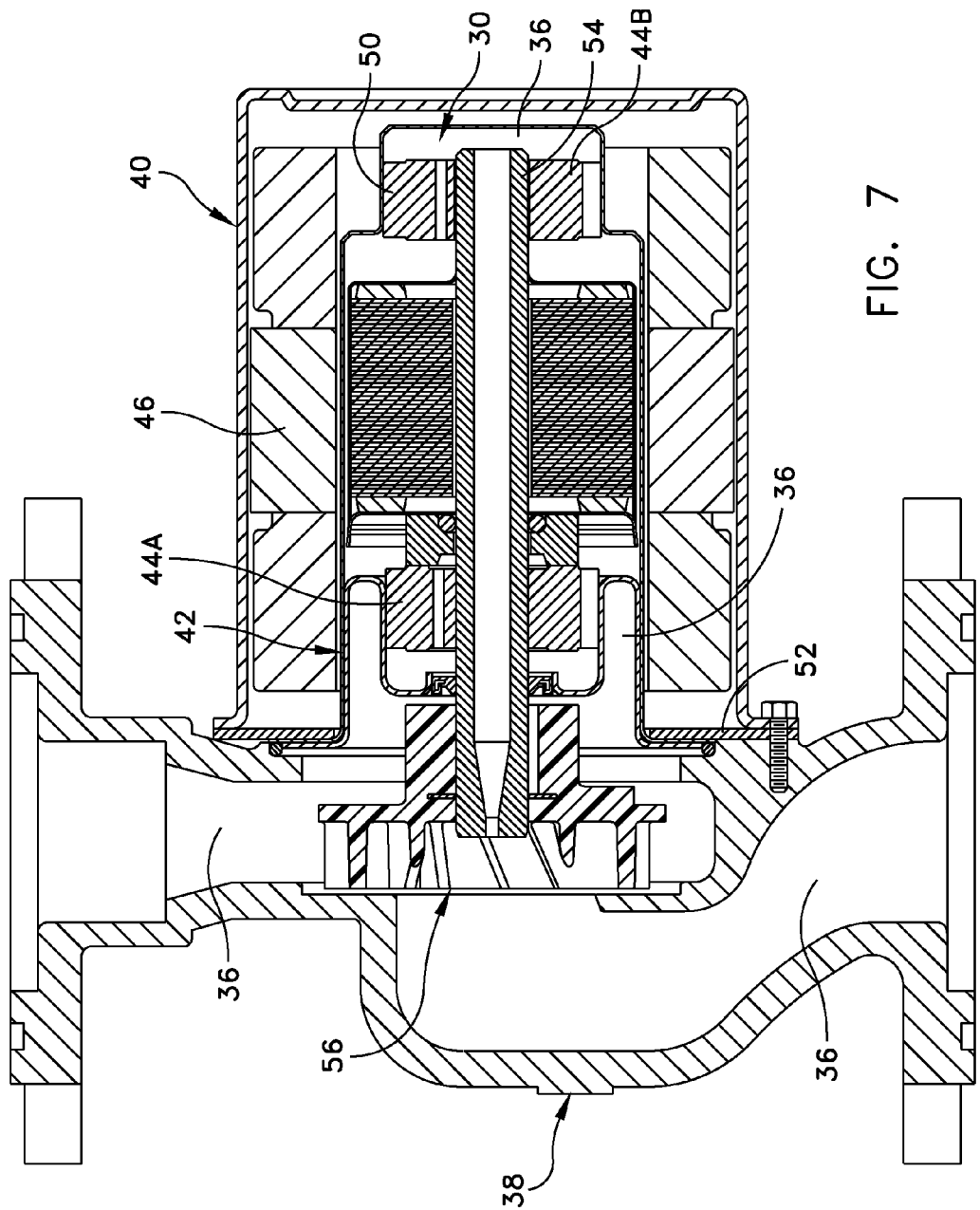
FIG. 7 is a cross-sectional view of a motor pump constructed in accordance with the principles of the present invention.
Figure 8:
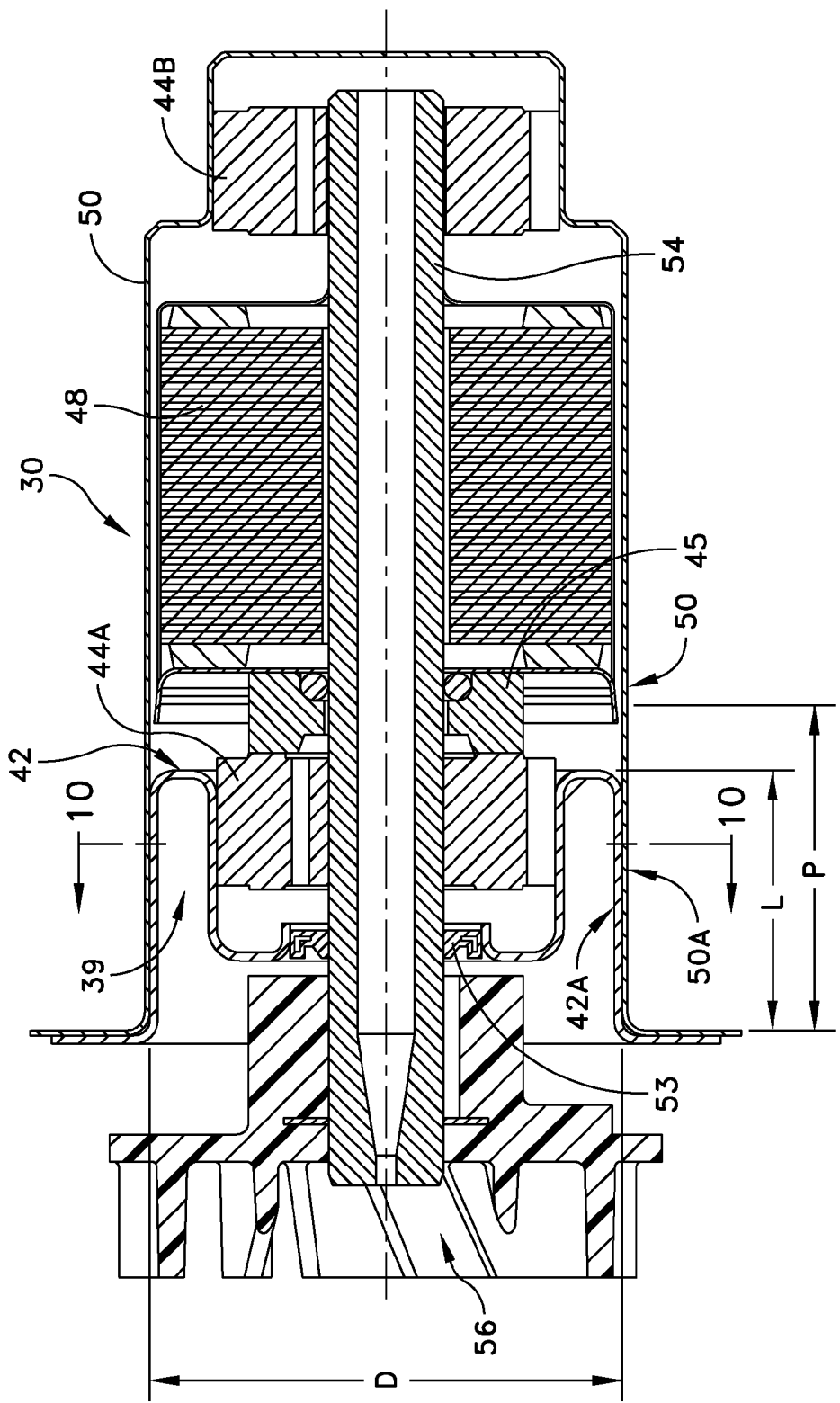
FIG. 8 is a cross-sectional view of the central sub-assembly (cartridge) of the pump of FIG. 7 and which contains all rotating parts.
Figure 9:
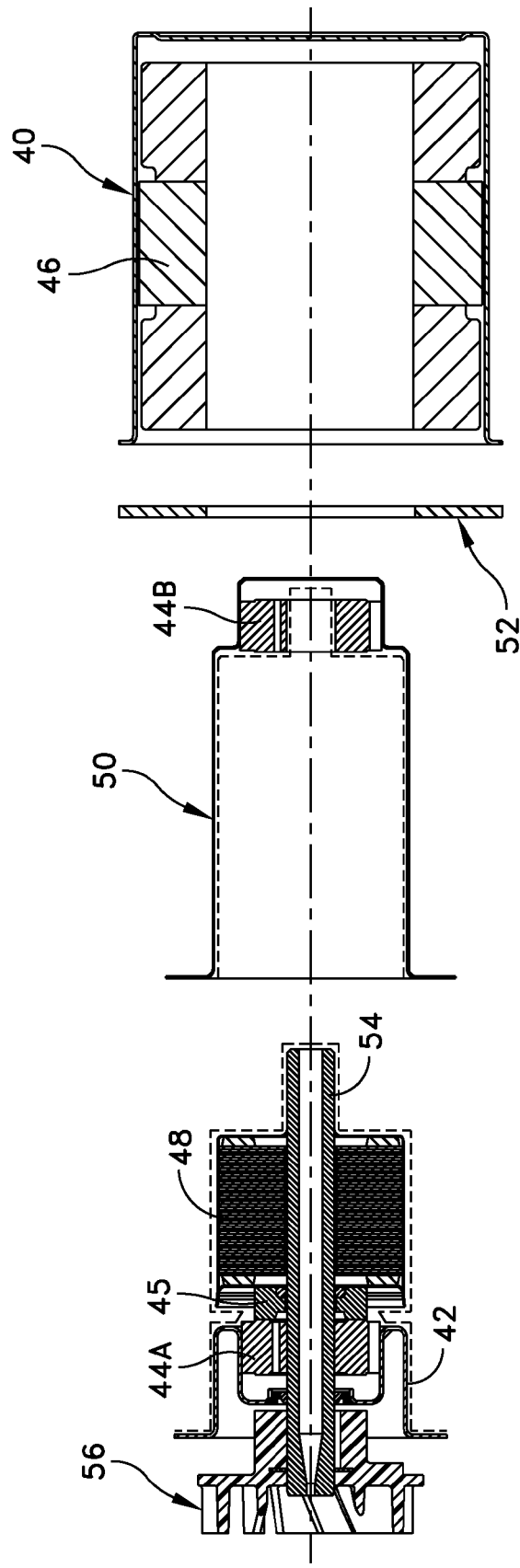
FIG. 9 shows the motor in its disassembled state.
Figure 10:
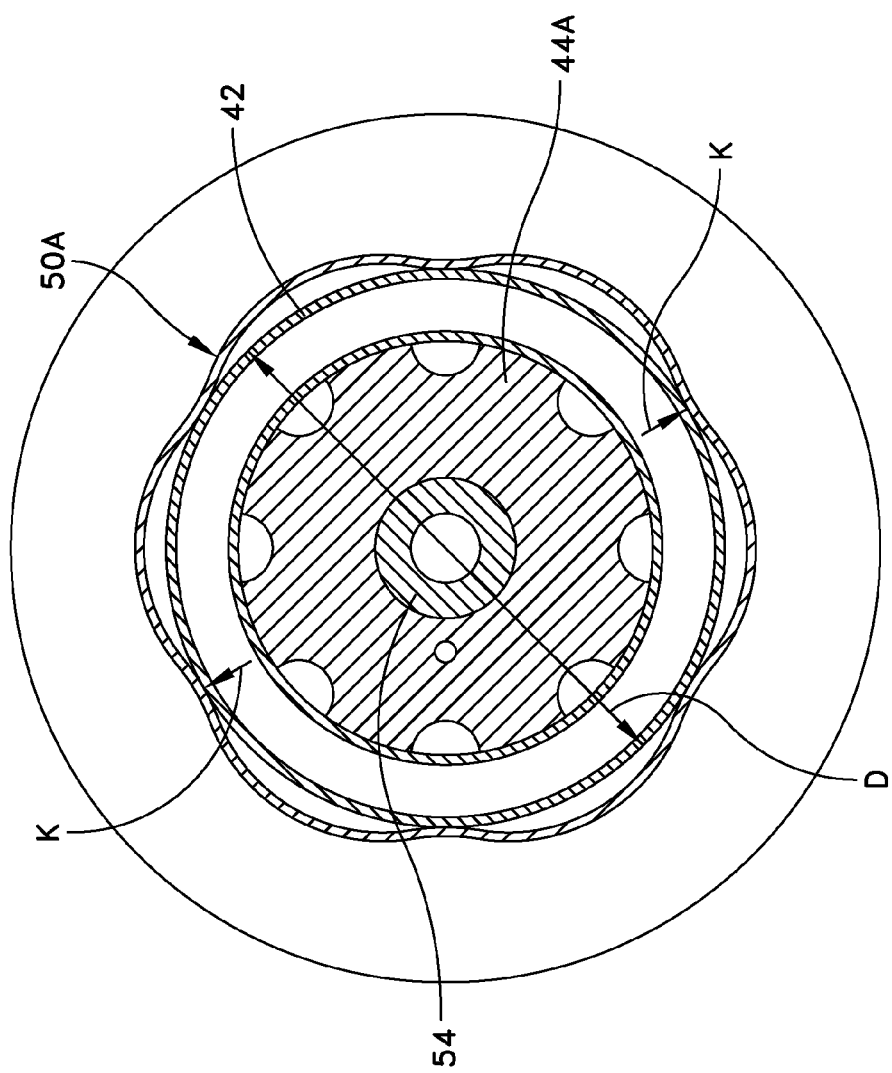
FIG. 10 is a cross-sectional view taken along line 10-10 of FIG. 8 to illustrate the novel sleeve of the present invention.

The pump illustrated in FIGS. 7-10 has similar components to those illustrated in the pump shown in FIG. 6. FIG. 7 is a cross sectional view of a motor pump which is characterized by excellent alignment and field serviceability. FIGS. 7-10 show further details of this pump including the pump housing 38, the motor housing 40, the front bearing support 42, as well as sleeve bearings 44A and 44B. Within the motor housing 40 is disposed the stator 46 and adjacent thereto the rotor 48. A sleeve 50 is shown supported between the rotor and stator. The support plate 52 secures the assembly to the pump housing. An O-ring 23 is provided between the shaft 54 and the bearing support 42. The shaft 54 holds the rotor and is supported by the two bearings 44A, 44B. The front end of the shaft 54 supports the pump impeller 56. A thrust washer 45 is preferably provided between bearing 14A and the rotor assembly. The rear bearing 14B is mounted in the sleeve 50 and the bearing support 42, to which front bearing 14A is mounted, is fitted to the sleeve 50. Refer to FIG. 8. In the disclosed pump structure the liquid is illustrated at 36 (see FIG. 7), flowing through the pump itself.

In FIG. 8 it is also noted that the bearing support member is preferably constructed with a reverse bend as at 39 in FIG. 8 where, at one side the bearing 44A is mounted, while the opposite side forms the pilot section 42A. Both of these sides are preferably cylindrical. The pilot section 42A is adapted for insertion into the corresponding pilot section 50A of the sleeve 50. There is thus formed an interface surface between the respective pilot sections 42A, 50A extending along dimension L in FIG. 8.

In accordance with the present invention, rather than providing a press-fit between the bearing support 42 and the sleeve 50, there is provided a pilot section P of the sleeve (see FIG. 8) that has an undulating, wavy shape, instead of a plain circular or cylindrical shape. In this regard refer to the cross-sectional view of FIG. 10 for an illustration of the shape of the sleeve along the length 50A corresponding to the pilot section P. The undulating shape is dimensioned so that a diameter touching the inside low points K (six of them in FIG. 10) of the sleeve length 50A in FIG. 10 is smaller than the outside diameter D of the pilot section L (see FIG. 8) of the bearing support 42. In this way, when pushing the rotor sub-assembly of FIG. 9A into the sleeve assembly of FIG. 9B in order to obtain the cartridge illustrated in FIG. 8, the waves or undulations are caused to flatten out to conform to the pilot diameter D of the bearing support 42. The section P preferably extends beyond the section L to assure that there is proper contact between the components. Although reference has been made to contact points, as at K in FIG. 10, because this wave pattern extends along the entire length of the pilot section P (50A) the contact is actually along a line that runs parallel to the shaft axis.

This combination of the wavy or undulating surface of the sleeve with the cylindrical nature of the bearing support thus provides essentially a clearance-less assembly. The wavy shape of the length 51A of the sleeve 50 functions as a radial spring. The sleeve length 50A preferably has a wall thickness in a range on the order of 0.006 to 0.020 inch. Because of the relative thinness of the sleeve wall, particularly along the section 50A, the spring forces are relatively small, allowing ready insertion and removal of the assembly (FIG. 9) by hand.

Another important aspect of the present invention is the use of a relatively long pilot (see dimension L in FIG. 8), thereby practically eliminating the sort of undesirable tilting described earlier for the bearing, i.e., angle "A" becomes practically zero (see FIG. 1). The length of the pilot section 42A (see FIG. 8) is preferably dimension L being not less than 50% of dimension D. By the use of the wavy sleeve configuration, two conditions have thus been eliminated that each contributes to a misalignment: These are (1) tilting of the bearing and (2) a clearance between the sleeve and the bearing support pilot.

Thus, with the improved bearing support/sleeve arrangement of the present invention there is provided an improved motor pump that is characterized by superior alignment, as well as ready serviceability in the field. Moreover this is enabled in accordance with the present invention by relatively simple means, primarily by providing an undulating surface between the bearing support member and the sleeve member. Thus, in accordance with the present invention there is provided an improved motor pump, particularly a canned motor pump comprised of a thin wall sleeve and a bearing support to form a rotor chamber, the bearing support being fitted by means of a pilot diameter to the inside diameter of the sleeve and the sleeve having undulations to eliminate any clearance between it and the bearing support, the undulations being formed so that easy movement of the pilot diameter in and out of the sleeve is possible.

Having now described a limited number of embodiments of the present invention it should now be apparent to one skilled in the art that numerous other embodiments and modifications thereof are contemplated a falling within the scope of the present invention. For example, in the embodiment that is disclosed, such as in FIG. 10, there are six valleys (point K). However, greater than or fewer than six may be used. The preferred number of points K is three. The disclosed embodiment also has the undulations on the outer sleeve. However, in an alternate embodiment of the invention the undulations may be in the bearing support member such as along the length L shown in FIG. 8. The material of the sleeve and bearing support is preferably metal, and can be of any number of types of metals. In the embodiment shown herein the principles of the present invention are particularly adaptable for use in a canned motor pump in which the liquid is, not only pumped through the device, but also passes through the pump itself. However, the principles of the present invention may also be used in connection with other pump types including those in which the fluid does not enter the pump itself.

What is claims is:

1. A motor pump comprising:
   a pump housing;
   a motor housing;
   a pump shaft supported in the motor housing and including an impeller extending into the pump housing;
   a rotor-stator structure in the motor housing for driving the shaft;
   a front bearing and a rear bearing for supporting the shaft;
   an annular bearing support member to which the front bearing is mounted;
   a tubular sleeve into which the annular bearing support member is inserted;
   and an interface surface defined between the annular bearing support member and the tubular sleeve and having an undulating surface with separate but multiple contact peak locations disposed between the bearing support member and the tubular sleeve;
   said undulating surface constructed and arranged so as to change from a less flattened out state before the annular bearing support member is inserted into the tubular sleeve to a more flattened out state when the annular bearing support member is inserted into the tubular sleeve to thus provide a spring force between the annular bearing support member and the tubular sleeve;

said annular bearing support member including an inner annular portion for supporting the front bearing, and an outer annular portion with the undulation surface disposed between the outer annular portion of the annular bearing support member and the tubular sleeve;

said outer annular portion having a diameter greater than the diameter of the inner annular portion;

said undulating surface formed integrally with one of the tubular sleeve and annular bearing support member.

2. The motor pump of claim 1 wherein the motor is a canned motor pump in which the fluid that is being pumped passes through the motor housing.

3. The motor pump of claim 1 wherein the bearing support member has a pilot section and the sleeve has a pilot section that includes the undulating surface, the respective pilot sections adapted for relative engagement therebetween.

4. The motor pump of claim 1 wherein the inner annular portion connects with the outer annular portion of the annular bearing support member by means of a reverse bend.

5. The motor pump of claim 4 wherein the undulating surface includes multiple undulations so as to provide multiple contact lines between the tubular sleeve and the annular bearing support member.

6. The motor pump of claim 1 wherein the annular bearing support member has a pilot section and the tubular sleeve has a pilot section with the undulating surface disposed between the respective pilot sections, the respective pilot sections adapted for relative engagement therebetween.

7. The motor pump of claim 6 wherein the pilot section of the tubular sleeve has a wall thickness in a range of 0.006 to 0.020 inch.

8. The motor pump of claim 6 wherein the pilot section L of the annular bearing support member is at least 50% of the diameter D of the tubular bearing support member.

9. The motor pump of claim 4 including a seal between the shaft and the bearing support member.

10. The motor pump of claim 9 including a thrust washer between the front bearing and the rotor-stator structure.

11. The motor pump of claim 1 wherein the bearing support member is constructed with a reverse bend.

12. The motor pump of claim 11 wherein the bend has the bearing mounted at one side thereof, while the opposite side engages with the tubular sleeve.

13. A method for providing an improved motor pump that enables the serviceability thereof, as well as improved clearance between components of the motor pump, the motor pump including a stator assembly, a rotor assembly having a front bearing for supporting a motor shaft and a bearing support member for receiving the front bearing, and a sleeve assembly including a sleeve, both the bearing support member and the sleeve having respective pilot sections, the method comprising the steps of providing an interface surface defined between the bearing support member and the sleeve that includes an undulating surface with separate but multiple contact locations therebetween, having the annular bearing support member include an inner annular portion for supporting the front bearing, and an outer annular portion with the undulation surface disposed between the outer annular portion of the annular bearing support member and the tubular sleeve, and with the outer annular portion having a diameter greater than the diameter of the inner annular portion, providing the undulating surface formed integrally with one of the tubular sleeve and annular bearing support member, providing respective inserted and withdrawn positions between the bearing support member and the sleeve, in the withdrawn position the undulating surface having peaks at a maximum diameter, and inserting the bearing support member into the sleeve so that the respective pilot sections engage to thus provide essentially a clearance-less fit therebetween, in the inserted position the peaks of the undulating surface having a diameter less than said maximum diameter, providing a spring force between the bearing support member and the sleeve.

14. The method of claim 13 wherein the interface surface permits ready engagement and dis-engagement between the bearing support member and the sleeve.

15. The method of claim 14 including providing the undulating surface on the sleeve.

16. The method of claim 15 including providing the pilot section of the bearing support member as a cylindrical surface.

17. The method of claim 16 wherein the undulating surface includes multiple undulations so as to provide multiple contact lines between the sleeve and bearing support member.

18. The method of claim 17 including three undulations.

19. The method of claim 16 including providing the pilot section of the sleeve with a wall thickness in a range of 0.006 to 0.020 inch.

20. The method of claim 16 including providing the pilot section L of the bearing support member is at least 50% of the diameter D of the bearing support member.

21. The motor pump of claim 1 wherein the undulating surface is formed as a continuous annular surface having multiple peak contact lines that extend in parallel with the pump shaft.

22. The motor pump of claim 21 wherein the undulating surface is of uniform thickness therealong.

23. The motor pump of claim 21 wherein the undulating surface is of sinusoidal form in cross-section.

24. The motor pump of claim 21 wherein the undulating surface is formed integrally with the tubular sleeve.

25. The motor pump of claim 21 wherein the undulating surface is formed integrally with the annular bearing support member.

\* \* \* \* \*